Patented June 25, 1946

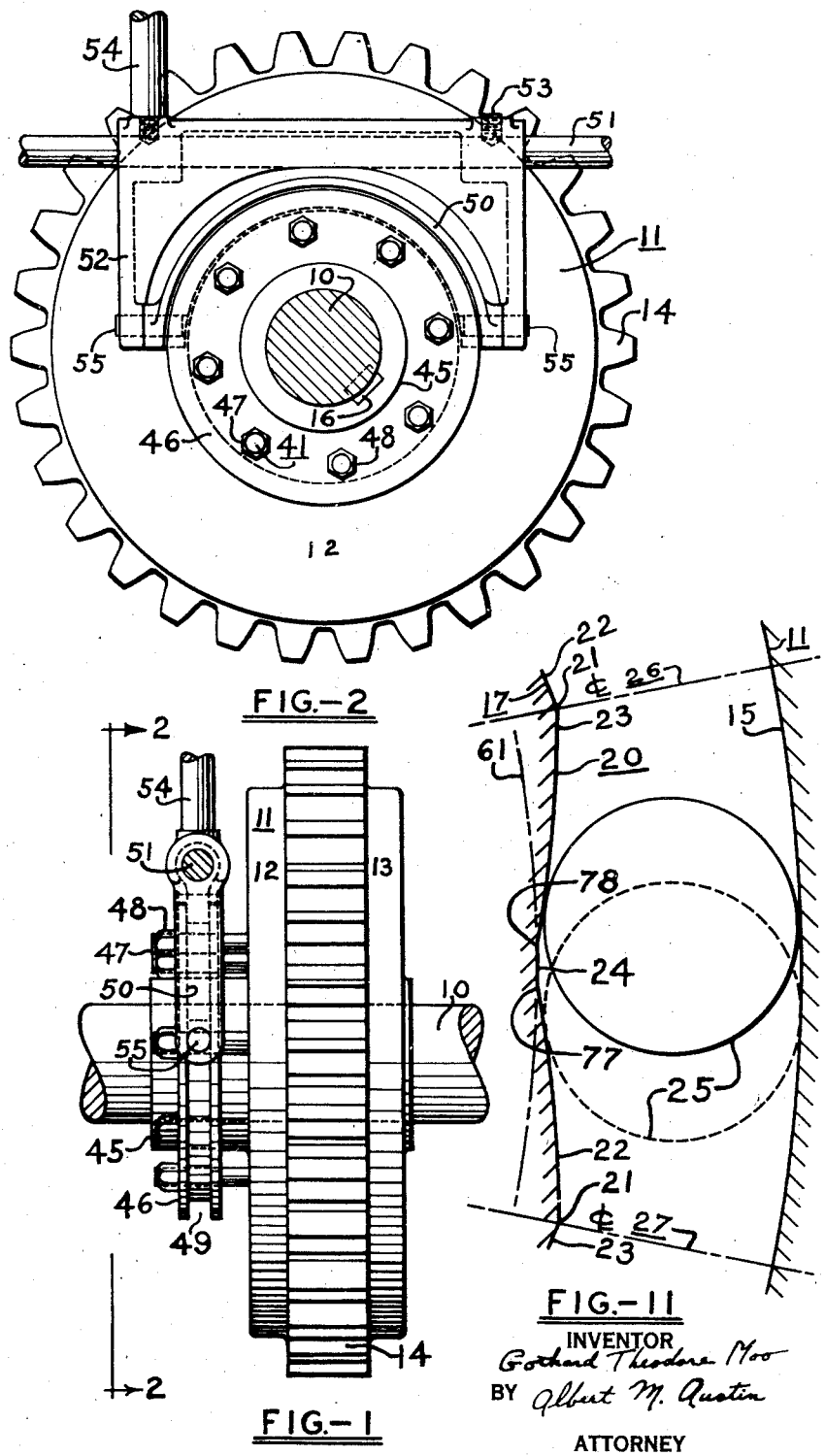

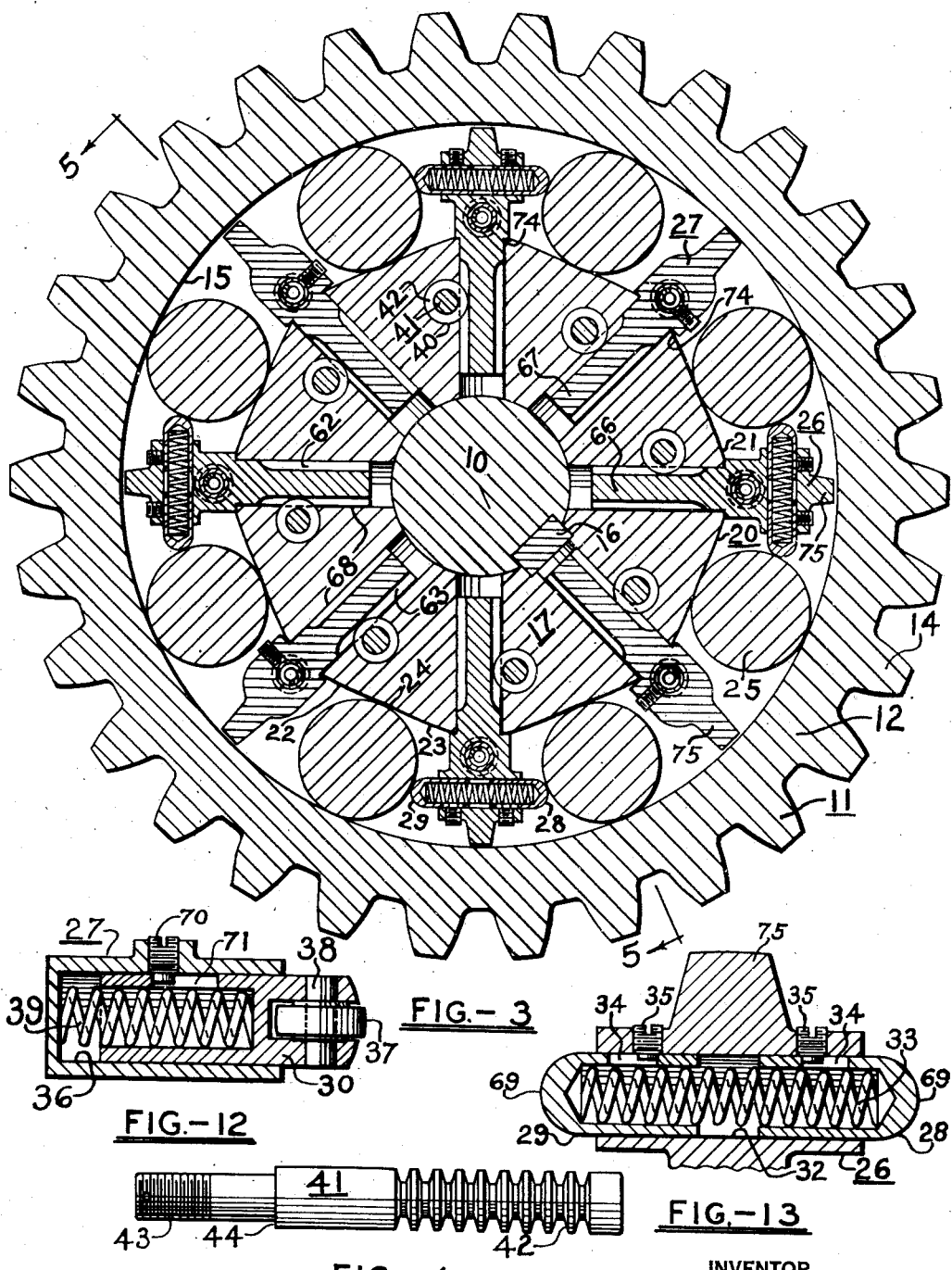

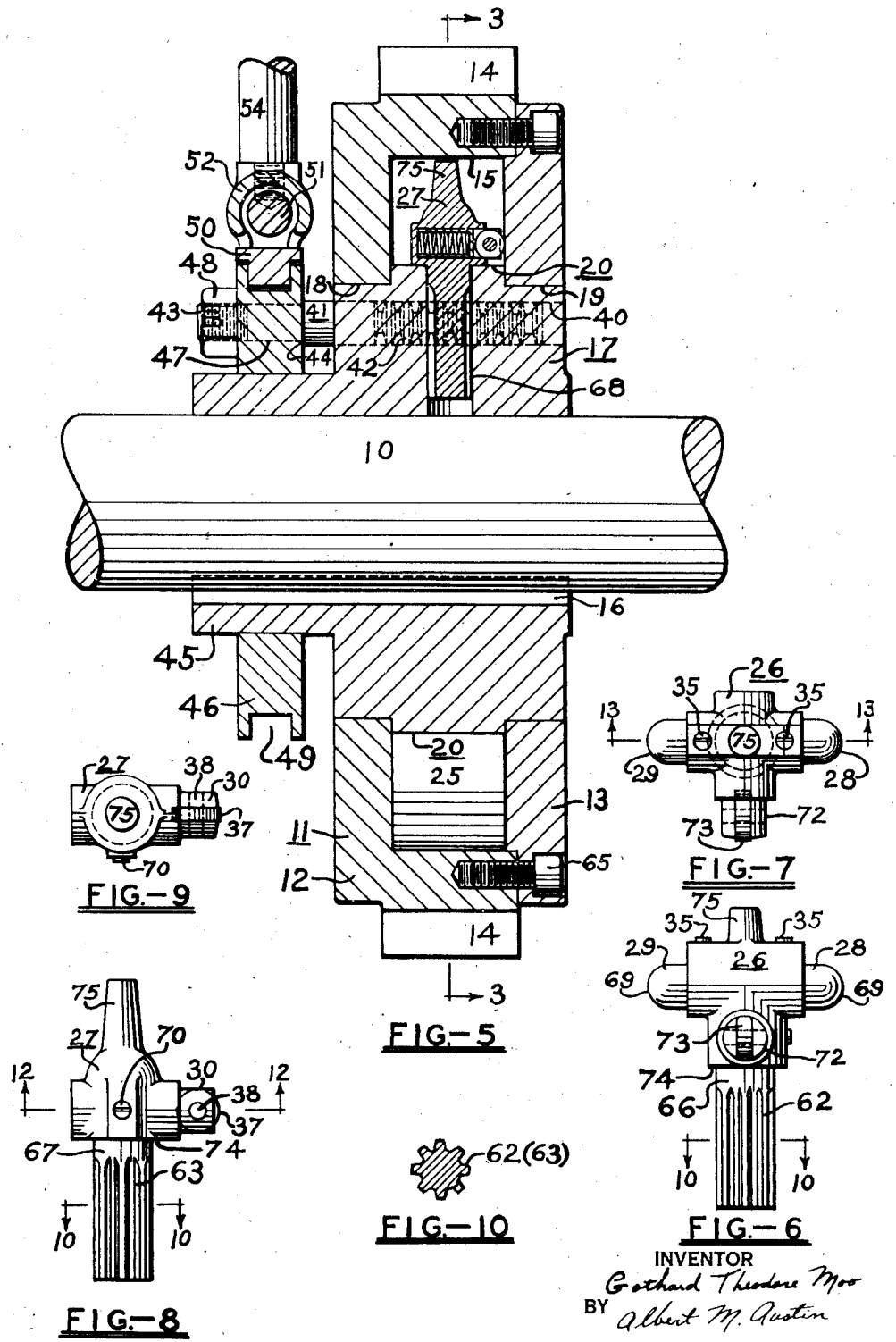

2,402,829

UNITED STATES PATENT OFFICE 2,402,829

CONTROLLABLE CLUTCH

Gothard Theodore Moo, Cranston, R. I., assignor to Weskenson Corporation, Providence, R. I., a corporation of Rhode Island Application February 25, 1942, Serial No. 432,230

12 Claims. (Cl. 192—44)

The invention relates to machine elements and, more particularly, to controllable clutches.

According to a preferred form of the invention, the controllable clutch comprises an inner body upon which is rotatably mounted an outer cage. The outer cage is provided with an internal circular raceway and the inner body is provided with an external raceway having a series of raised portions forming wedging surfaces on either side. A plurality of rollers are located between the raceways. At the high points of the raised portions are journaled a series of radially extending control members or turrets. These turrets are divided into two sets, one set consisting of triple turrets and the other set consisting of single turrets, the turrets of the different sets being disposed in alternate relationship. The triple turrets have at an upper level oppositely extending spring pressed contact members adapted to bear against the rollers on either side whereby the clutch may be locked, that is, prevented from overrunning in either direction. The single turrets together with the triple turrets are provided at a lower level with single spring pressed contact members disposed at right angles to the contact members in the upper level. These lower level members may be turned to press against the rollers on either side of the turrets, selectively, so that when these contact members are disposed in one direction, the clutch exhibits overrunning characteristics in a corresponding direction and, when these members are rotated 180°, the clutch exhibits overrunning characteristics in the other direction.

All of the turrets are preferably rotated by axially slidable racks engaging pinions on the turrets, these racks being controlled by a collar slidable on the hub of the overrunning clutch and controllable by a shoe riding in a groove in this collar. The several contact members mounted upon the turrets are preferably all spring pressed to permit rotation of the turrets irrespective of the instantaneous position of the rollers. The wedging surfaces may be laid out on individual spirals, each spiral being of constant rise extending from its low point to its high point. If desired, a dwell of constant radius may be disposed between each pair of wedging surfaces at the low points thereof.

The invention is illustrated as applied to cylindrical rolls operating between generally cylindrical members, but it may also be applied to spherical rolls operating between generally cylindrical members and it may be applied to tapered rolls acting between generally radial members.

The invention also consists in certain new and original features of construction and combination of parts, hereinafter set forth and claimed.

Although the novel features, believed to be characteristic of this invention, will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a side elevation of the clutch;

Fig. 2 is an end view taken on the line 2—2 of Fig. 1;

Fig. 3 is a radial section taken on the line 3—3 of Fig. 5, showing the rolls in position for positively locking the driving and driven elements;

Fig. 4 is a side elevation of the round rack used to revolve the turrets;

Fig. 5 is a longitudinal section taken on the line 5—5 of Fig. 3;

Fig. 6 is the front view of one of the triple turrets;

Fig. 7 is the top or plan view of the triple turret;

Fig. 8 is the front view of one of the single turrets;

Fig. 9 is the top or plan view of the single turret;

Fig. 10 is section taken on line 10—10 of Fig. 6 or Fig. 8;

Fig. 11 is a diagrammatic view illustrating the inner raceway;

Fig. 12 is an enlarged section on the line 12—12 of Fig. 8; and

Fig. 13 is an enlarged section on the line 13—13 of Fig. 7.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the shaft 10 is supported for rotation in suitable bearings (not shown). Keyed to shaft 10 by key 16 is a body or core 17. Surrounding body 17 is a cage 11 comprising a case 12 and detachable cap 13 secured thereto by machine screws 65. Formed on case 12 is a spur gear 14 having driving relation with another spur gear or rack (not shown).

The internal surface of case 12 is provided with a cylindrical outer raceway 15. The body 17 is provided with two bearing surfaces 18 and 19, on which cage 11 is journaled. The external surface of body 17 forms an inner raceway 20. The inner raceway 20 has eight high portions 21, each of which has wedging surfaces 22 and 23 extending to low portions 24. These low portions 24 may or may not be of constant radius to provide dwells between the wedging surfaces.

Disposed between outer raceway 15 and inner raceway 20 are eight cylindrical rolls 25. For controlling the position of these rolls with respect to wedging surfaces 22 and 23, in the form shown, four triple turrets 26 (Figs. 6 and 7) and four single turrets 27 (Figs. 8 and 9) are provided. Turrets 26 and 27 have shafts or stems 66 and 67 on which spur gear teeth 62 and 63 are formed. These shafts 66, 67 are disposed in radial bores 68 intersecting the body member 17 at the high portions. The turrets 26 and 27 are held axially by shoulders 74 engaging the inner raceway 20 and by tower portions 75 engaging the outer raceway 15.

Referring to Figs. 5 and 12, each single turret 27 is provided with a closed end bore 36 in which is slidably disposed a plunger 30, the end of which is slotted to receive a disc-like contact roller 37 which is free to rotate on pin 38. Inserted in the plunger 30 and seated against the bottom of hole 36 is compression spring 39. To prevent the plunger 30 from being forced out of hole 36 a half dog point set screw 70 is threaded into the body of the turret, engaging an elongate slot 71 in the plunger. The closed end of the elongate slot 71 engaging said screw 70 limits outward movement of the plunger 30 when not in contact with a roll 25.

Referring to Figs. 3 and 13, the triple turrets 26 have spring contact members at two levels. In the upper level is a hole 32 and disposed therein and free to slide are hollow plungers 28 and 29. The noses 69 of these plungers are hemispherical and form contacts to engage the rolls 25. A compression spring 33 rests in plungers 28 and 29, tending to force them outwardly from the center of turrets 26.

To restrain the movement of the plungers 28 and 29, two half dog point set screws 35 are threaded into the body of the turrets and the half dog points of these screws fit into elongated slots 34 cut in the plungers 28 and 29. The closed ends of elongate slots 34 limit the movement of plungers 28 and 29 outwardly of hole 32 when the plungers are not in contact with a roll 25.

Each triple turret 26 has at its lower level a third spring pressed member. This member identified by 72 in Figs. 6 and 7 is similar in construction to the contact member 30 of the single turrets 27, and has a contact roller 73 corresponding to contact roller 37 for engaging the main wedging rolls 25.

For controlling and adjusting the turrets 26 and 27, there are located in body 17 eight axial holes 40, one for each turret. Disposed in these holes and free to slide are round racks 41, the rack teeth 42 of which mesh spur gear teeth 62 and 63 of turrets 26 and 27. The round racks 41 are threaded at 43 and have shoulders 44 for connection to thimble 46 (Fig. 5).

Formed on the body 17 is a hub 45 on which is slidably mounted the thimble 46. Thimble 46 has eight holes 47 in which are disposed the reduced ends of the round racks 41. Nuts 48 hold the thimble 46 tight against the shoulders 44 of the racks 41.

For axially moving thimble 46, annular groove 49 is provided in which is disposed a semi-circular shoe 50 (Fig. 2). A shaft 51 is suitably journaled in bearings (not shown) and forms a pivot point for forked arms 52 which are pivoted to shoe 50 by pins 55. The arms 52 are mounted on shaft 51 and held in position by a set screw 53 and by the threaded end of shift lever 54.

Thus, by moving shift lever 54 the thimble 46 may be slid axially on hub 45, moving racks 41 which in turn rotate turrets 26 and 27 on their own axes.

Wedging surfaces 22 and 23 are preferably laid out as constant rise curves, each surface 22 and 23 rising at a constant rate from the dwell 24 to its high point 21. This constant rise curve is sometimes referred to as the spiral of Archimedes and is generated the same way as the continuous spiral in my copending application Serial No. 421,887, filed December 6, 1941.

Referring now to Fig. 11, the shape of the spiral is illustrated diagrammatically. The base circle centered at the center of shaft 10 is indicated by 61. The constant radius dwells 24 are laid out on this circle. The spirals of wedging surfaces 22, 23 begin at points 77 and 78 and depart from circle 61 at a constant rate with increase in polar angle from points 77 and 78; i. e., the spirals have a constant rise.

This constant rise may be represented by a fixed angle formed by laying out the base circle 61 as a straight line and laying off as abscissa along this straight line equal distances corresponding to the angles from the beginning of the spiral; and then laying off as ordinates the distances of the spiral from the base circle. The spiral then becomes a straight line and the angle with the base may be called the "critical angle." This angle is constant for any given spiral of this type and is the same as the angle formed by a tangent to the spiral at any given point on the spiral and by a tangent to the circle passing through that point having its center coincident with the center of the shaft.

For best working of the overrunning clutch the tangent of this critical angle should be less than the coefficient of friction of the materials of the rolls and races when coated with the lubricant which is to be used but is preferably very little less. If the tangent of the critical angle is larger than the coefficient of friction, slipping of the rolls in their races is liable to occur and the gripping or wedging action of the rolls with their races will be impaired.

Thus, by making the critical angle as large as possible without causing slipping, the crushing effect on the rolling members and on the contacting race surfaces is minimized. Furthermore, the spiral angle being constant, the rolling members act under the same conditions through the entire extent of their movement from free to wedging or gripping position.

The clutch has three main positions of operation:

1. *Locked position.*—When shift lever 54 is at the position as shown in Figs. 1 and 5, the parts of the clutch take the position as shown in Figs. 3 and 5. Here turrets 26 and 27 are in such position that plungers 30 and 72 are not in contact with any of the rolls 25, but the position of turrets 26 is such that plungers 28 are contacting and forcing rolls 25 into operative engagement position with tapered surfaces 23 and raceway 15 and plungers 29 are contacting and forcing the remaining rolls 25 into their operative engagement positions with tapered surfaces 22 and raceway 15. This may be called the "locked" position of the clutch since power may be transmitted from shaft 10 to cage 11 or from cage 11 to shaft 10 in either direction of rotation without any lost motion.

2. *Overrunning in one direction.*—When shift lever 54 is moved to the right of the position as shown in Figs. 1 and 5, it causes thimble 46 and round racks 41 to move to the left and, as rack teeth 42 are in mesh with spur gear teeth 62, 63 of turrets 26 and 27, this movement causes turrets 26 and 27 to revolve 90 degrees from the position as shown in Figs. 3 and 5, thus bringing plungers 72 and 30 of turrets 26 and 27 into contact with rolls 25, and forcing all rolls 25 into operative engagement position with tapered surfaces 23 and raceway 15. This provides overrunning clutch action so that clockwise rotation of shaft 10 (Fig. 3), will drive cage 11 or counter-clockwise rotation of cage 11 will drive shaft 10, the parts overrunning in each case.

3. *Overrunning in other direction.*—When shift lever 54 is moved to the left of the position shown in Figs. 1 and 5, it causes thimble 46 and round racks 41 to move to the right and, as rack teeth 42 are in mesh with spur gear teeth 62, 63 of turrets 26 and 27, this movement causes turrets 26 and 27 to revolve 90 degrees from position as shown in Figs. 3 and 5, which is also 180 degrees from the position as taken in condition 2 above, thus bringing plungers 72, 30 of turrets 26 and 27 into contact with rolls 25, and forcing all rolls 25 into operating engagement position with tapered surfaces 22 and raceway 15. This provides overrunning clutch action so that counter-clockwise rotation of shaft 10 (Fig. 3) will drive cage 11 or clockwise rotation of cage 11 will drive shaft 10, the parts overrunning in each case.

Thus a controllable clutch is provided which is susceptible of a variety of operations by merely shifting a simple lever. A reciprocating movement applied to either the shaft or the cage may be converted into a unidirectional movement and the direction of unidirectional movement may be changed simply and easily. The shaft and cage may also be locked together. It is obvious that this device may be used in any transmission where such controllable movement is necessary or desirable. A plurality of such devices may be used through which different reciprocating motions may be applied to the same driven element to give uniform rotation in the same direction.

A particular feature of the device is the fact that the shift lever 54 may be moved at any time regardless of whether clutch is transmitting power or not. For example, we will assume that shift lever 54 and the parts operated by same, such as thimble 46, round racks 41 and turrets 26 and 27, etc., take the position as indicated by condition 2 above. Now shift lever can be moved left as indicated in condition 3 and thimble 46, round racks 41 and turrets 26 and 27, etc., will also move to their correct positions for condition 3. If power is being transmitted, rolls 25 will remain in position as explained for condition 2 but as soon as the power is slightly reduced, rolls 25 will immediately assume the position as indicated by condition 3. This is due to the fact that in shifting from condition 2 to condition 3 the springs of plungers 72, 30 have been compressed or pre-loaded, and the release of power releases rolls 25 from their operative engagement positions of condition 2 and the force exerted by the pre-loaded springs of plungers 72, 30 force rolls 25 into their operative engagement positions as indicated for condition 3. If no power is being transmitted at the moment the shift takes place, then the rolls 25 immediately assume their new positions.

It will be noted that the noses 69 of the opposed upper level spring pressed members are merely rounded since, when they engage the rolls on either side, the rolls and the rollways are relatively stationary, there being no rolling movement of rolls 25. On the other hand, the spring pressed members at the lower level have wheels or rollers 37 and 73 for engaging the wedging rolls 25 to reduce friction since these rolls rotate with respect to the spring pressed members while the clutch is performing its overrunning function.

The use of spiral wedging surfaces instead of surfaces laid out on straight lines insures uniformity of action of the clutch, since all parts of the wedging surfaces engaged between rolls have the same wedging angle throughout the full cycle of movement of the roll performing its engaging and disengaging function. The spiral surface facilitates manufacture in that they are very easy to generate by modern machinery. The selection of the wedging angle with its tangent just below the coefficient of friction of the materials, when coated with the lubricant which is to be used, improves the operation of the clutch, and increases its life since it minimizes the wedging and peening action to which the rolls and rollways are subjected.

While certain novel features of the invention have been disclosed and are pointed out in the annexed claims, it will be understood that various omissions, substitutions and changes may be made by those skilled in the art and without departing from the spirit of the invention.

What is claimed is:

1. In an overrunning clutch, a first body having a constant level rollway, a second body having a variable level rollway provided with high and low portions having wedging surfaces therebetween, rolling members disposed between said rollways, said second body having a plurality of bores at said high portions, triple turrets journaled in alternate bores, single turrets journaled in intermediate bores, said triple turrets having opposed spring pressed members and a single spring pressed member disposed at right angles to said opposed members, said single turrets each having a single spring pressed member corresponding to said triple turret single spring pressed members, and means for rotating said turrets about their own axes to selectively engage said rolling members by said opposed members to lock the clutch, or to engage said rolling members by said single members on one side, or the other side, of said turrets to obtain overrunning action in a corresponding direction.

2. In an overrunning clutch, an inner body, an outer cage journaled on said body, said outer cage having an internal circular rollway, said body having an external rollway provided with high and low portions having wedging surfaces therebetween, rolling members disposed between said rollways, said body having a plurality of radial bores at said high portions, triple turrets journaled in alternate bores, single turrets journaled in intermediate bores, said single and triple turrets each comprising a cylindrical stem disposed in its respective bore, said triple turrets having opposed spring pressed members secured to said stem at an upper level and a single spring pressed member secured to said stem at a lower level and disposed at right angles to said opposed members, said single turrets each having a single spring pressed member corresponding to said lower level spring pressed members, and means for rotating said turrets about their own axes to selectively engage said rolling members by said upper level members to lock the clutch, or to engage said rolling members by said lower level members on one side, or the other side, of said turrets to obtain overrunning action in a corresponding direction.

3. In an overrunning clutch, an inner body, an outer cage journaled on said body, said outer cage having an internal circular rollway, said body having an external rollway provided with high and low portions having wedging surfaces therebetween, rolling members disposed in said rollways, said body having a plurality of radial bores at said high portions, triple turrets journaled in alternate bores, single turrets journaled in intermediate bores, said single and triple turrets each comprising a cylindrical stem with a pinion disposed in its respective bore, said triple turrets having opposed spring pressed members secured to said stem at an upper level and a single spring pressed member secured to said stem at a lower level and disposed at right angles to said opposed members, said single turrets each having a single spring pressed member corresponding to said lower level spring pressed members, said body having a plurality of axial bores, racks in said bores meshing said pinions, means for axially adjusting said racks to selectively engage said rolling members by said opposed upper level members to lock the clutch, or to engage the rolling members by said lower level members on one side, or the other side, of said turrets to obtain overrunning action in a corresponding direction.

4. In an overrunning clutch, a shaft having an inner body keyed thereto and an outer cage journaled on said body, said outer cage having an internal circular rollway, said cage having an external rollway provided with high and low portions having wedging surfaces therebetween, rolls disposed in said rollways, said body having a plurality of radial bores at said high portions, triple turrets journaled in alternate bores, single turrets journaled in intermediate bores, said single and triple turrets each comprising a cylindrical stem with a pinion disposed in its respective bore, said triple turrets each having opposed spring pressed members secured to its stem at an upper level and a single spring pressed member secured to its stem at a lower level and disposed at right angles to said opposed members, said single turrets each having a single spring pressed member corresponding to said lower level spring pressed members, said body having a plurality of axial bores, circular racks in said axial bores meshing said pinions, said body having a hub, a collar slidable on said hub and secured to said racks, and means for axially adjusting said collar to selectively engage said rolls by said opposed upper level members to lock the clutch, or to engage the rolls by said lower level members on one side, or the other side, of said turrets to obtain overrunning action in a corresponding direction.

5. In an overrunning clutch, an annular cage having a constant level rollway, an inner core having a variable level rollway provided with high and low portions having wedging surfaces therebetween, rolling members disposed between said rollways, said core having a plurality of bores between said wedging surfaces, turrets having shanks journaled in said bores, said turrets having resilient arms, means for rotating said turrets to cause their resilient arms selectively to operate against the rolling members on one side of the turrets or the other and forcing said rolling members into engagement with the wedging surfaces remote from the turrets whereby to obtain overrunning action in one direction or the other.

6. In a clutch, a first body having a constant level way, a second body having a variable level way provided with high and low portions having wedging surfaces therebetween, wedging members disposed between said ways, a turret carried by said second body and journaled on an axis intersecting said ways, said turret having a projecting portion, means for rotating said turret to cause said projecting portion to selectively operate against the wedging member on one side of the turret or the other, and yieldable means associated with said projecting portion to force the wedging member against a wedging surface remote from the turret.

7. In a clutch, a first body having a constant level way, a second body having a variable level way provided with high and low portions having wedging surfaces therebetween, wedging members disposed between said ways, a turret journaled on an axis intersecting said ways and disposed between said wedging surfaces, said turret having a resilient arm attached thereto and projecting therefrom for yieldably urging a wedging member away from the turret.

8. In a clutch, a first body having a constant level way, a second body having a variable level way provided with high and low portions having wedging surfaces therebetween, wedging members disposed between said ways, a turret journaled on an axis intersecting said ways and disposed between said wedging surfaces, said turret having opposed control portions for simultaneously operating against the wedging members on opposite sides of the turret and forcing said wedging members into engagement with the wedging surfaces remote from the turret.

9. In a clutch, an annular cage having a constant level rollway, an inner core having a variable level rollway provided with high and low portions having wedging surfaces therebetween, rolling members disposed between said rollways, said core having a bore between said wedging surfaces, a turret having a shank journaled in said bore, said turret having opposed resilient arms for simultaneously operating against the rolling members on opposite sides and forcing said rolling members into engagement with the wedging surfaces remote from the turret.

10. In a clutch, a cage having a constant level rollway, a core having a variable level rollway provided with high and low portions having wedging surfaces therebetween, rolling members disposed between said rollways, said core supporting a plurality of turrets journaled on axes intersecting said ways, said turrets being disposed between said rolling members, said turrets having projecting portions for urging said rolling members away from the turrets, certain of said projecting portions urging said rolling members into engagement with said wedging surfaces, certain of said projecting portions urging said rolling members out of engagement with said wedging surfaces, and means for rotating said turrets about their own axes to change the character of the clutch.

11. In an overrunning clutch, a cage having a constant level rollway, a core having a variable level rollway provided with high and low portions having wedging surfaces therebetween, rolling members disposed between said rollways, said core having a plurality of bores at said high portions, triple turrets journaled in alternate bores, single turrets journaled in intermediate bores, said triple turrets having opposed control portions and a single control portion disposed at right angles to said opposed control portions, said single turrets each having a single control portion corresponding to said triple turret single control portion, and means for rotating said turrets about their own axes to selectively engage said rolling members by said opposed portions to lock the clutch, or to engage said rolling members by said single control portions on one side, or the other side, of said turrets to obtain overrunning action in a corresponding direction.

12. In an overrunning clutch, a first body having a constant level way, a second body having a variable level way provided with high and low portions, a turret journaled at a low portion in said second body on an axis intersecting said ways, said high and low portions providing wedging surfaces near said turret and on either side thereof and also providing wedging surfaces remote from said turret and on either side thereof, a wedging member on either side of said turret between said ways and adapted to engage selectively its near or remote wedging surface, said turret having a resilient arm, and means for rotating said turret to cause said arm to selectively operate upon a wedging member on either side of the turret for yieldably urging the wedging member from its near wedging surface to its remote wedging surface.

GOTHARD THEODORE MOO.